United States Patent
Brooks et al.

(10) Patent No.: US 7,610,584 B2
(45) Date of Patent: Oct. 27, 2009

(54) METHOD, SYSTEM, AND PRODUCT FOR DEFINING AND MANAGING PROVISIONING STATES FOR RESOURCES IN PROVISIONING DATA PROCESSING SYSTEMS

(75) Inventors: Patrick Joseph Brooks, Toronto (CA); Rhonda L. Childress, Austin, TX (US); Liana Liyow Fong, Irvington, NY (US); Walter Joseph Grom, Jr., Sleepy Hollow, IL (US); Stewart Jason Hyman, Toronto (CA); Michael Husayn Kalantar, Millwood, NY (US); Steve M. Weinberger, Lewis Center, OH (US)

(73) Assignee: International Business Machines Corporation, Armonk, NY (US)

( * ) Notice: Subject to any disclaimer, the term of this patent is extended or adjusted under 35 U.S.C. 154(b) by 1295 days.

(21) Appl. No.: 10/751,317

(22) Filed: Jan. 2, 2004

(65) Prior Publication Data

US 2005/0149610 A1 Jul. 7, 2005

(51) Int. Cl.
*G06F 9/46* (2006.01)
(52) U.S. Cl. .................. 718/100; 718/101; 718/102; 718/104; 718/105
(58) Field of Classification Search .............. 718/100, 718/101, 102, 104, 105
See application file for complete search history.

(56) References Cited

U.S. PATENT DOCUMENTS

| | | | | |
|---|---|---|---|---|
| 5,694,539 | A * | 12/1997 | Haley et al. ............... | 714/38 |
| 6,173,175 | B1 | 1/2001 | Alazma et al. ............. | 455/423 |
| 6,198,813 | B1 | 3/2001 | Pullen et al. .............. | 379/201 |
| 6,298,454 | B1 | 10/2001 | Schleiss et al. ........... | 714/37 |
| 6,389,126 | B1 | 5/2002 | Bjornberg et al. ......... | 379/201.03 |
| 6,460,082 | B1 | 10/2002 | Lumelsky et al. ......... | 709/226 |
| 6,470,073 | B1 * | 10/2002 | Fish et al. ................. | 379/32.01 |
| 6,871,232 | B2 | 3/2005 | Curie et al. | |
| 6,985,955 | B2 | 1/2006 | Gullotta et al. | |
| 2002/0032590 | A1 * | 3/2002 | Anand et al. .............. | 705/7 |
| 2002/0156894 | A1 | 10/2002 | Suorsa et al. | |
| 2002/0158900 | A1 | 10/2002 | Hsieh et al. | |

(Continued)

FOREIGN PATENT DOCUMENTS

JP 2004086545 A * 3/2004

(Continued)

*Primary Examiner*—Van H Nguyen
*Assistant Examiner*—Kenneth Tang
(74) *Attorney, Agent, or Firm*—Yee & Associates, P.C.; William H. Steinberg

(57) ABSTRACT

A method, system, and computer program product are described for managing the provisioning of resources in a data processing system. There are different types of resources. Each resource is one of these types. Multiple provisioning states are defined for each type of resource. Relationships are defined among the provisioning states. The relationships describe valid transitions from one state to another. Workflows of one or more tasks are defined, varying to the resource implementation specifications, that are associated with each one of the valid transitions between states. When a resource is to transition from a current state, the relationships among states are used to determine a valid next state. The workflow specific to the resource specification and associated with this transition from the current state to the determined next state is then executed in order to transition to the next state.

3 Claims, 11 Drawing Sheets

300

| VALID STATES | SERVER GROUP | SERVER | VLAN | SWITCH PORT | LICENSED APPLICATION SOFTWARE |
|---|---|---|---|---|---|
| REQUESTED | X | | | | |
| FAILED | X | X | | | X |
| DELETE FAILED | X | X | | | X |
| PROCESSING | X | X | | | X |
| DELETE REQUESTED | X | X | | | X |
| DELETED | X | | | | |
| DELETING | X | X | | | X |
| OPERATIONAL | X | X | | X | X |
| NON-OPERATIONAL | | X | X | X | X |
| AVAILABLE | | X | X | | X |
| RESERVING | | X | X | | X |
| RESERVED | | X | X | | X |
| PREASSIGNED | | X | | | X |
| UN-PREASSIGNED | | X | | | X |

U.S. PATENT DOCUMENTS

2002/0188644 A1    12/2002  Seidman
2002/0194244 A1 *  12/2002  Raventos .................... 709/101

FOREIGN PATENT DOCUMENTS

| JP | 2004295516 A | * | 10/2004 |
| JP | 2004334430 A | * | 11/2004 |
| JP | 2004348473 A | * | 12/2004 |
| KR | 2004023435 A | * | 3/2004 |

* cited by examiner

300

| VALID STATES | SERVER GROUP | SERVER | VLAN | SWITCH PORT | LICENSED APPLICATION SOFTWARE |
|---|---|---|---|---|---|
| REQUESTED | X | | | | |
| FAILED | X | X | | | X |
| DELETE FAILED | X | X | | | X |
| PROCESSING | X | X | | | X |
| DELETE REQUESTED | X | X | | | X |
| DELETED | X | | | | |
| DELETING | X | X | | | X |
| OPERATIONAL | X | X | | X | X |
| NON-OPERATIONAL | | X | X | X | X |
| AVAILABLE | | X | X | | X |
| RESERVING | | X | X | | X |
| RESERVED | | X | X | | X |
| PREASSIGNED | | X | | | X |
| UN-PREASSIGNED | | X | | | X |

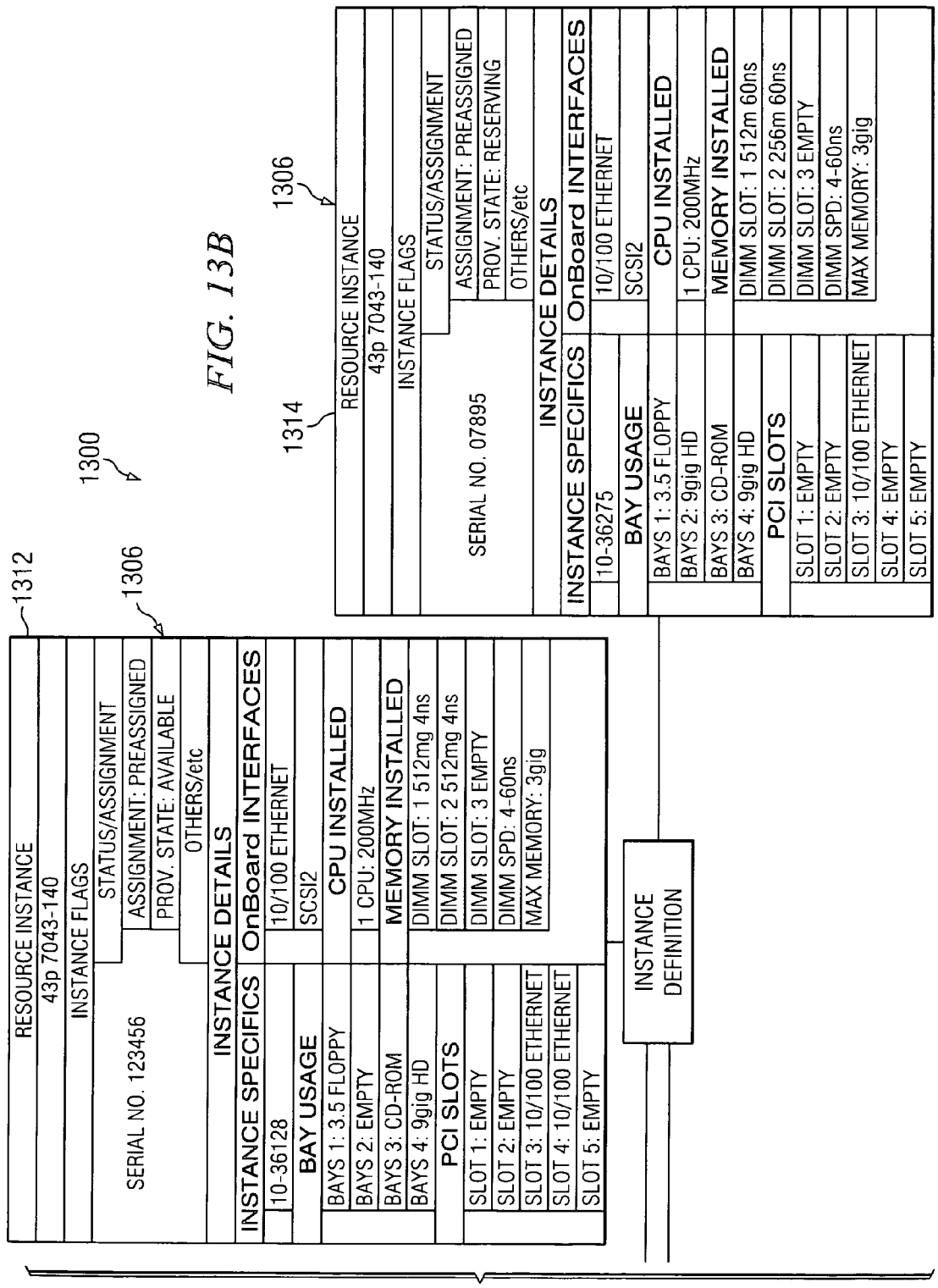

METHOD, SYSTEM, AND PRODUCT FOR DEFINING AND MANAGING PROVISIONING STATES FOR RESOURCES IN PROVISIONING DATA PROCESSING SYSTEMS

BACKGROUND OF THE INVENTION

1. Technical Field

The present invention relates generally to resource provisioning and auto-provisioning systems, and in particular to a method, system, and product for defining and managing provisioning states of resources in such systems.

2. Description of Related Art

As businesses attempt to respond more quickly to changing needs and circumstances, there is an increased need for the capability to quickly reallocate resources used in information technology (IT). It is envisioned in one model of computer services that business will be able to contract with an IT provider for services. In this model, a provisioning organization will provide computer hardware and software that can be flexibly interconnected to serve a client as long as necessary, but can then be released back to a general pool, or pools, when the need has passed. The provisioning organization can provide equipment and software to a client's site or provide the services through connections to the needed resources at another site. Once the resource is released back to the general pool, or pools, systems can be reconfigured to meet the needs of the next client as necessary.

It is known that the processes associated with adding or reallocating IT resources can be lengthy and tedious. Ideally, an automatic provisioning (or auto-provisioning) system can allocate and configure computing resources with little or no human intervention, such that these resources can be placed into, or removed from, operation quickly and efficiently. Operations personnel can then be relieved of much of the burden of managing an infrastructure consisting of computing resources, making operations more cost effective. Auto-provisioning can also facilitate a more fluid, timely and automated allocation and configuration of resources, allowing management to use more variable and profitable pricing strategies, such as a metered utility service provider might use.

In a provisioning system, resources can be divided into a number of resource types. Resources may be physical resources such as servers and switch ports, logical resources such as logical partitions of a server and IP addresses, or virtual resources such as virtual local area networks (VLANs).

Instances of resources can be categorized by resource types. For example, a server is a type of resource. The particular server having serial number 123456 is a particular individual server and is referred to herein as an "instance" of a server or a "particular" server. Herein, the term "resource" should be understood to mean resource instance.

Furthermore, instances can be grouped by some set of attributes of the resource instances themselves. For example, server instances can be grouped into disjoint subsets by server model number which reflects an implementation specification of servers. A set of resource instances can then be described by its type and an implementation specification. In this way, a resource type contains a number of implementation specifications each of which contains a number of resource instances.

For another example, software is a resource type. Software can be further divided into sub-types by their capability specification such as operating system software to control system components and database software to manage a data repository. In this preferred embodiment, the terms implementation specification, capability specification, specification, and resource specification are used inter-changeably to refer to sub-typing of a resource type.

Provisioning of resources of different types is very complex in a provisioning system. Therefore, a need exists for a method, system, and computer program product in a provisioning data processing system for defining and managing provisioning states for many different resource types such that a resource of a particular type transitions through that type's provisioning states using a set of tasks or workflow processes during the provisioning of the resource.

SUMMARY OF THE INVENTION

A method, system, and computer program product are described for managing the provisioning of resources in a data processing system. There are different types of resources. A resource type can be further categorized by one or more implementation or capability specifications. Each resource matches one of the specifications of a particular type. Multiple provisioning states are defined for each type of resource. Relationships are defined among the provisioning states. The relationships describe valid transitions from one state to another. A workflow of one or more tasks is defined, varying by specifications, for each one of the valid transitions between states. When a resource is to transition from a current state, the relationships among states are used to determine a valid next state. The workflow of one or more tasks, of an appropriate specification, associated with this transition from the current state to the determined next state is then executed in order to transition to the next state.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 13A and 13B together are a block diagram that illustrates a particular resource hierarchy including definitions of particular resource type, implementations and instances in accordance with the present invention.

DETAILED DESCRIPTION OF THE PREFERRED EMBODIMENT

Figure 1:
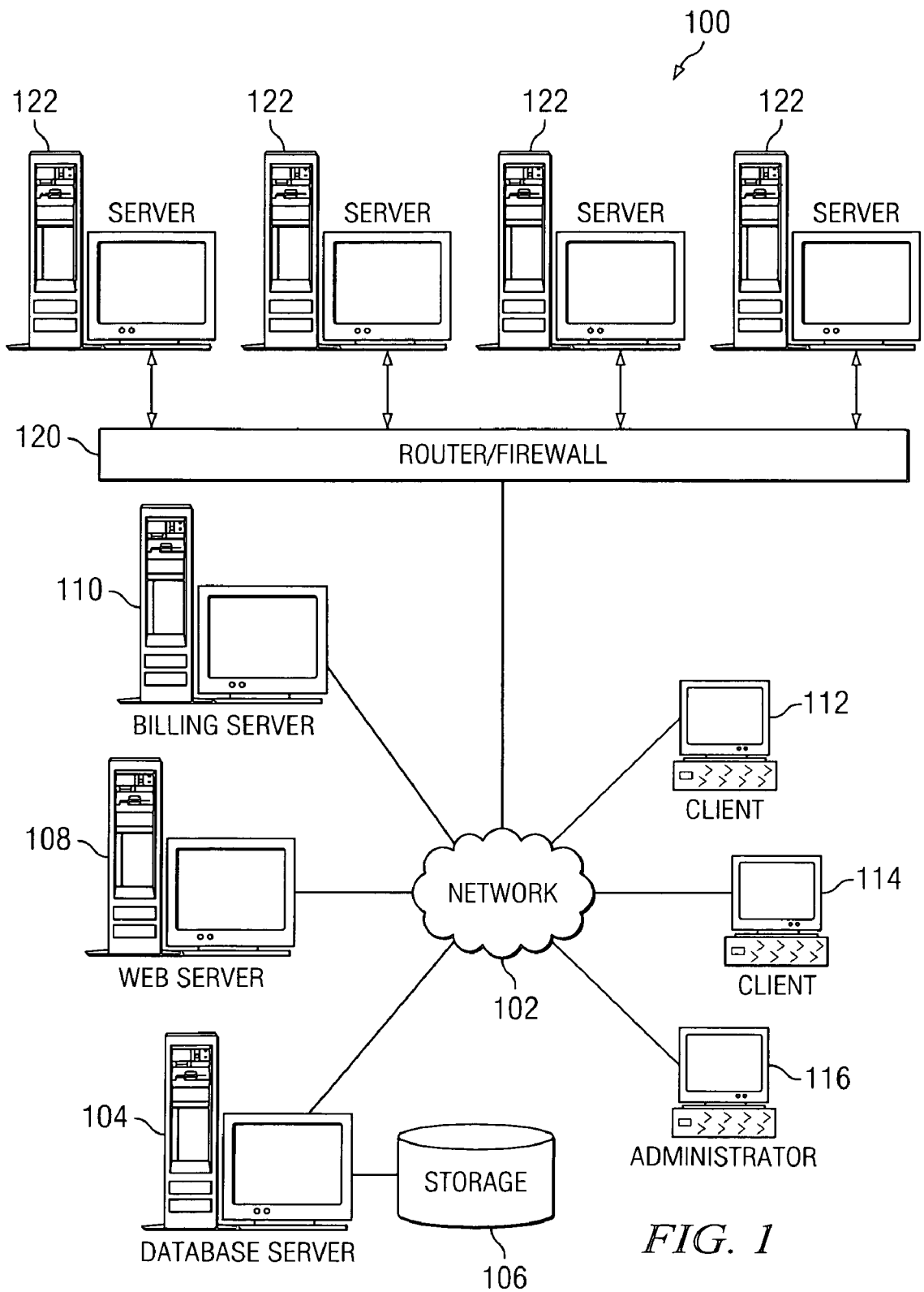
FIG. 1 is a block diagram of a data processing system in which the present invention may be implemented in accordance with the present invention FIGS. 2A and 2B together are a block diagram that illustrates a set of resources in a provisioning environment after a number of provisioning requests have been made and the resources have been provisioned in accordance with the present invention.

A preferred embodiment of the present invention and its advantages are better understood by referring to the figures, like numerals being used for like and corresponding parts of the accompanying figures.

Computing resources included in an autoprovisioning system depend on the type of services provided. For example, a storage management service will include only network storage devices while a web management server might have servers, network storage devices, network switches, operating system software, and application software. Moreover, computing resources do not have to be hardware or software entities, but can be logical or virtual constructs. The present invention uses the term "resource" to include physical, logical, and virtual entities.

Physical resources may include servers, network interface cards, firewall devices, network storage devices, load balance devices, and switch ports. Logical resources include customer environment, server groups, network storage allocation, software allocation, and IP addresses. Virtual resources include VLANs and virtual machines. These are not exhaustive lists of types of resources. Any device or entity that is considered a resource of a data processing system can be considered to be a "resource" in this embodiment.

In this preferred embodiment, resources can be modeled using a hierarchical model. This model contains three levels: resource type, resource implementation, and resource instance. Each level is a container for the subsequent levels. Therefore, a resource type contains or has related to it a number of resource implementations, and a resource implementation contains or has associated with it any number of resource instances.

To provision a resource, one or more particular tasks must be executed. These tasks may be manual or automatic tasks. In addition, the types of tasks that are necessary in order to provision a resource may vary according to the type and specification of the resource being provisioned. These tasks may need to be performed in a particular order or sequence.

The present invention provides a method, system, and computer program product for provisioning resources by defining and managing the states that a resource may be in during the provisioning of the resource. Resources are deployed, imaged, and configured based on the current and destined states of the resource.

For each resource type, one or more provisioning states is defined. Thus, at any time during the process of provisioning a resource, the resource will be in one of these defined states. A state diagram is generated for each type of resource that defines the valid transitions among the states that are defined for the type of resource.

For each state, a workflow of one or more tasks is defined to be executed in order to move the resource from one state to another state along the valid state transitions. The workflow is a sequence of the one or more tasks. The type and contents of workflow tasks are defined by the implementation of the resource. For example, to transition a switch port from a Non-operational state to an Operational state would require one set of login procedures and commands for a Xylan brand switch, and another set of tasks for a Cisco brand switch.

When an instance of a resource is to be transitioned from one state to another during the provisioning process, the current provisioning state of that particular resource is determined. The state diagram for the particular type of resource is used to determine which states are valid possibilities to be the next state. For example, for servers, a state diagram may define a Delete Requested state that may be achieved only after an Operational state. Therefore, if a particular server is currently in the Operational state, the server may be moved during the provisioning process to the Delete Requested state. If, however, the server is currently in the Available state, the server may not be transitioned to the Delete Requested state. Thus, the state diagram defines the valid sequence of provisioning states for each type of resource.

Once the current provisioning state and a valid next provisioning state are determined, the workflow that is defined for moving from the current state to the next state is executed. After these tasks are executed successfully, the resource will be in the next provisioning state. This process may be repeated until the desired final provisioning state for the resource is achieved.

The workflow that is required to be completed prior to transitioning from one state to another may be defined according to the resource type and implementation. Some possible state transitions may be defined according to the intrinsic conditions of the resource. For example, a physical resource may transition from an Operational state to a Non-operational state based on the physical working condition of the particular resource. A server with a failed power supply, for example, will change from the Operational state to the Non-operational state. Other state transitions may be defined according to operation controls of the particular resource. For example, a server may transition from the Available state to the Reserved state if it is selected for use.

There can be conditional transitions as well. That is, additional conditions must hold before the workflow to move from one state to another can be executed or can complete execution. For example, resources may have a subordinated relationship with other resources. In such cases, for a resource to transition from one state to another depends on the subordinate resources completing their own state transitions. For example, a server group consists of a number of particular server instances. Thus, the state transition of a server group will only be completed if all of the servers of the group have completed their state transitions.

Resource provisioning using resource states and their associated tasks are structured modularly in the above described manner provides many benefits including functional encapsulation, ease of maintenance, reusability, and flexibility. Moreover, states can be used to guide error determination and recovery. When a resource fails in moving from one state to another, one needs to examine the functional scope of the state transition to determine possible errors. It is also possible to devise two sets of tasks for state transitions, one for moving forward and another for moving in an opposite direction in case of errors.

Figure 10:
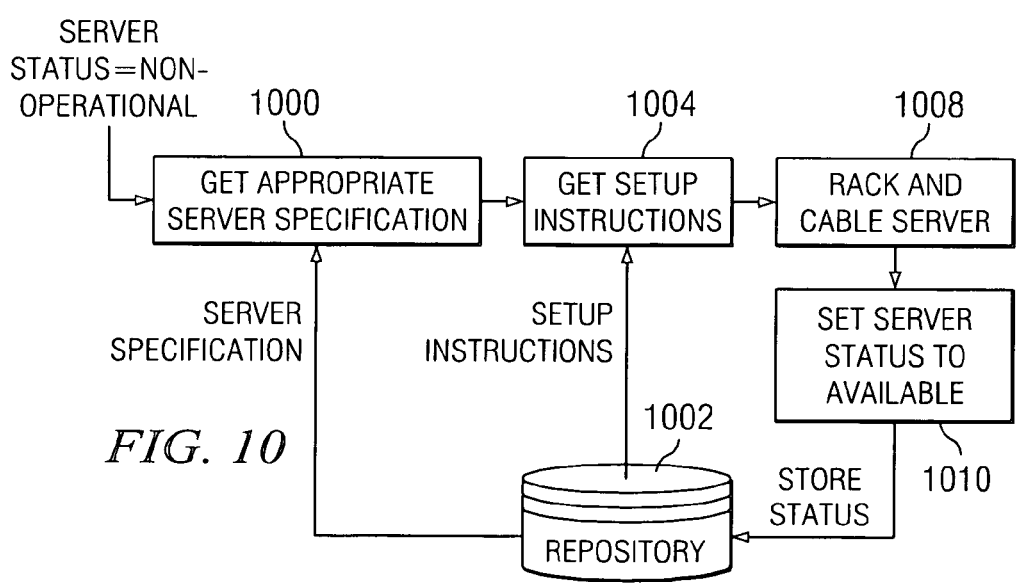
FIG. 10 is a block diagram that depicts an example of workflow for moving a server from a "Non-operational" state to an "Available" state in accordance with the present invention.

Modules of tasks may also be defined and used for transitioning between states for more than one implementation specification. For example, if two implementations of a resource type require the same set of tasks in order to transition between two states, a single module of tasks may be defined and then used by resources instances of either implementation specification. For a more specific example, the transition from the state of "non-operational" to "available" for IBM pSeries servers of implementation model 43P and 45P are the same and thus can use the same task module as shown in FIG. 10. Moreover, task modules may also be reusable across resource types. For example, the transition from the state of Preassigned to Un-Preassigned for server type and licensed application software type are the same and thus reusable across these two resource types.

The characteristics of this invention can be further explained in the drawings and descriptions as follows.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, database server 104 is connected to network 102 and provides access to storage unit 106. Web server 108 and billing server 110 are also connected to network 102. Server group 122 is connected to the network through router/firewall 120. Database server 104, Web server 108, billing server 110, and server group 122 are examples of resources in network data processing system 100. In fact, the router itself, the firewall, and other hardware or software elements are also examples of resources that are part of network data processing system 100. These resources are also possible entities to be deployed and configured in the provisioning systems.

In addition, clients 112, 114, 116 are connected to network 102. These clients may be, for example, personal computers or network computers. In the depicted example, database server 104 provides data, such as boot files, operating system images, and applications to clients 112, 114, 116. Clients 112, 114, 116 are clients to server 104. Network data processing system 100 may include additional servers, clients, and other devices not shown.

Particularly, administrator client 116 is a client to be used by a provisioning administrator to define and provision resources in network data processing system 100.

FIG. 1 is intended as an example, and not as an architectural limitation for the present invention.

Figure 2A:
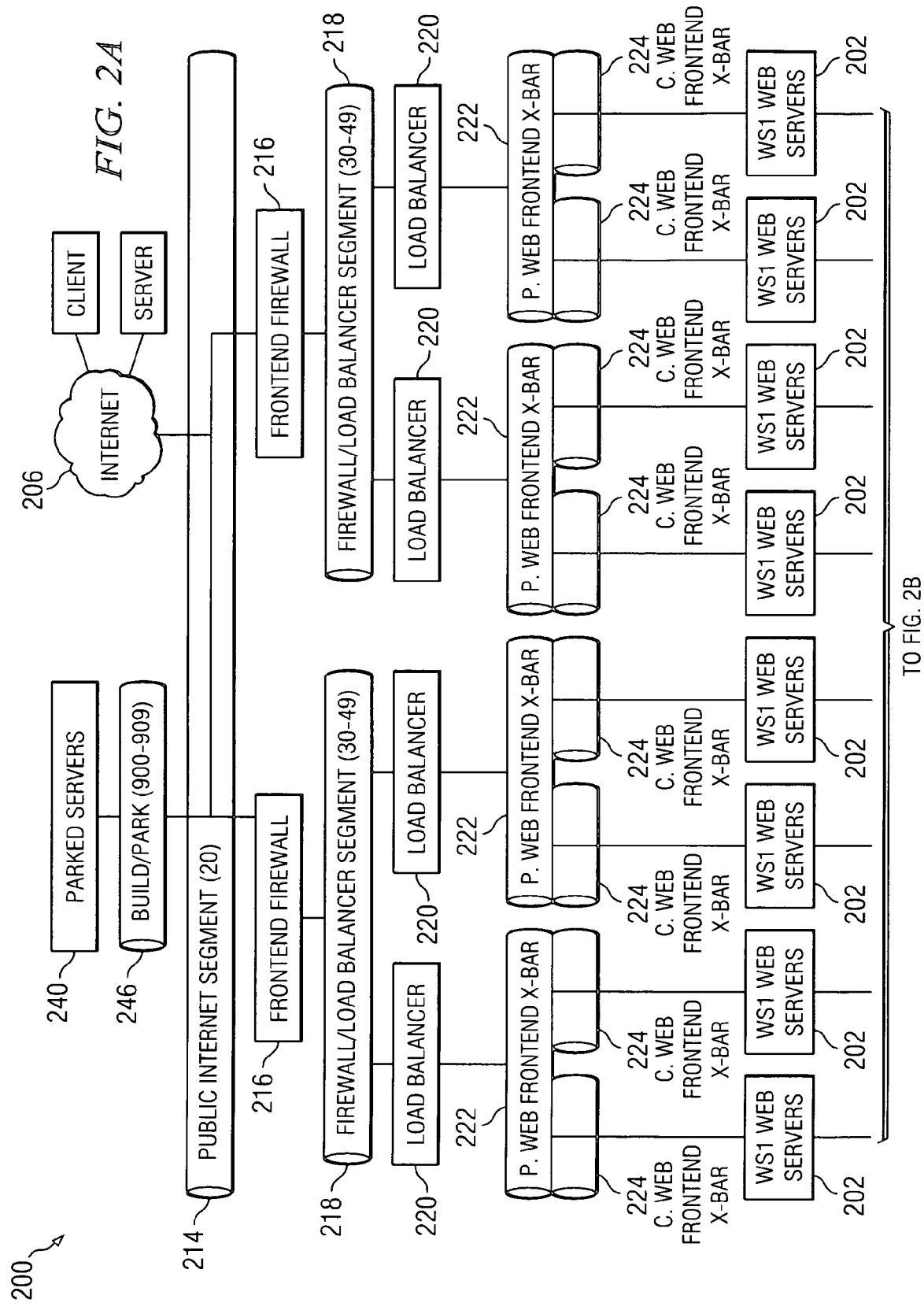
Figure 2B:
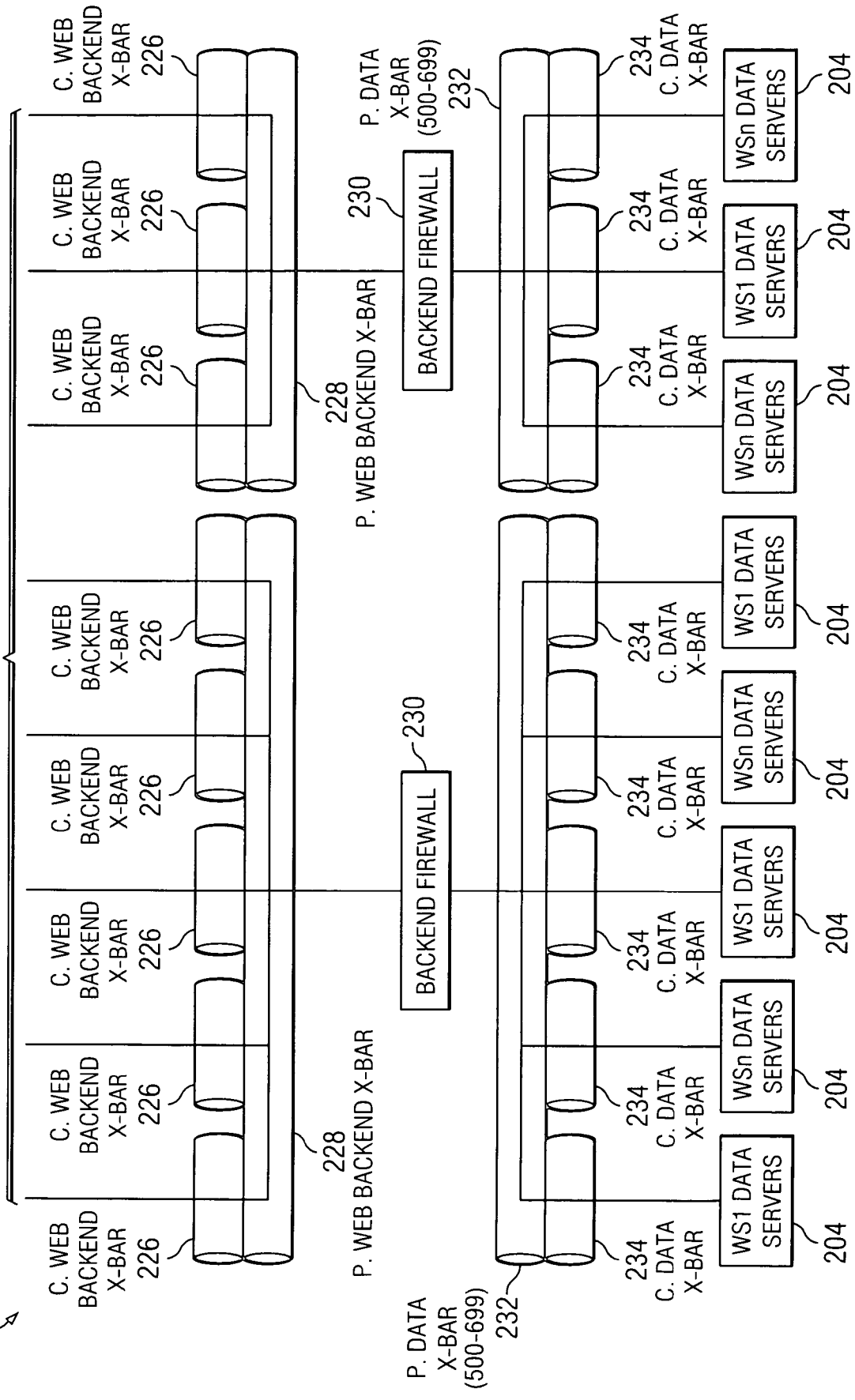

FIGS. 2A and 2B are a block diagram that illustrates a set of resources in a provisioning environment after a number of requests have been made and the resources have been provisioned in accordance with the present invention. In general, the invention applies to any set of computing resources. In FIGS. 2A and 2B, the set of resources represents a protected two-tiered network topology 200. Virtual networks (VLANs) are shown in the diagram using "pipes". Each is labeled with a range of numbers that are considered valid for a VLAN of that type. Note that the numbering is a notational convenience and not a required feature of this architecture. The shorter, unlabeled pipes are "community" VLANs. Community VLANs are a specialized type of VLAN not supported by all hardware platforms.

Traffic from outside the environment passes from the Internet 206 through a Public Internet Segment VLAN 214. It then passes through a frontend firewall 216 to a Firewall/Load Balancer Segment 218. From there, it passes through a load balancer 220 to a primary Web Frontend x-bar (cross-bar) VLAN 222 and to a community Web Frontend x-bar 224. Although not depicted in the figure, the primary 222 and community 224 Web Frontend x-bar VLANs may each have valid numbers such as (100-299). Note that while all traffic physically passes through a load balancer, this does not mean that all traffic is load balanced. Load balancing across a subset of the web servers is optional. The traffic from community Web frontend x-bar 224 reaches a Web Server 202. Traffic from a web server 202 to a data server 204 passes through the community Web Backend x-bar VLAN 226 to primary Web Backend x-bar VLAN 228 to a Backend firewall 230 and then to a primary Data x-bar VLAN 232 and community Data x-bar VLAN 234. Finally it reaches a data server 204.

Computing resources included in an autoprovisioning system may be grouped into different types having varying degrees of granularity. Each type may be associated with a set of attributes or specifications that are common to those resources. For example, the types of resources may be classified into server hardware, network hardware, storage hardware, and software. A resource type can be further divided into groups such as by their capability and/or implementation specifications. Instances of a resource type are resource instances, which are then grouped by their resource implementations. The present invention describes a resource hierarchy model for storing, managing, provisioning, and maintaining accurate information about these various resources in a provisioning system.

Figure 12A:
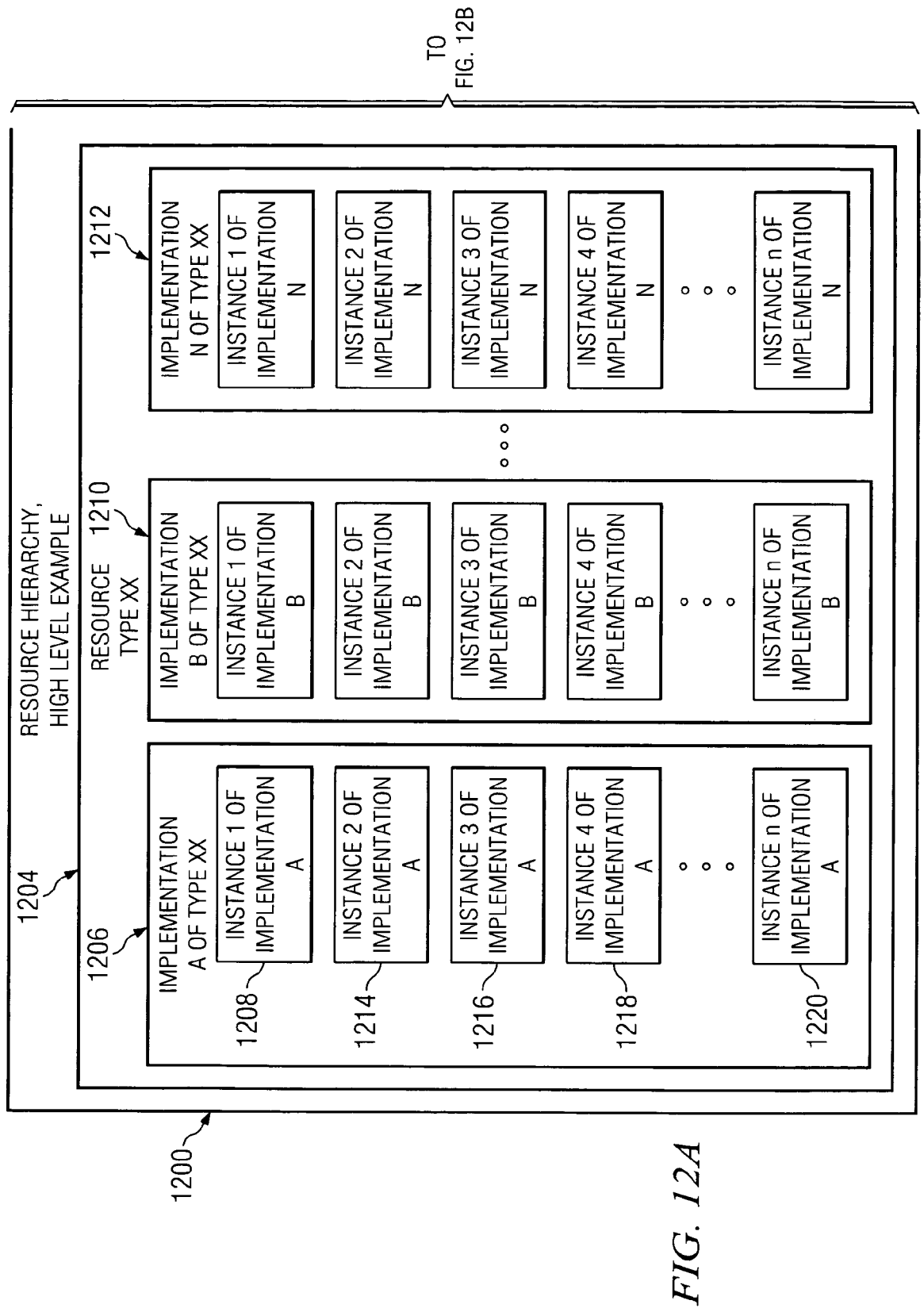
FIGS. 12A and 12B together are a block diagram that illustrates a resource hierarchy model and an example resource hierarchy in accordance with the present invention.
Figure 12B:
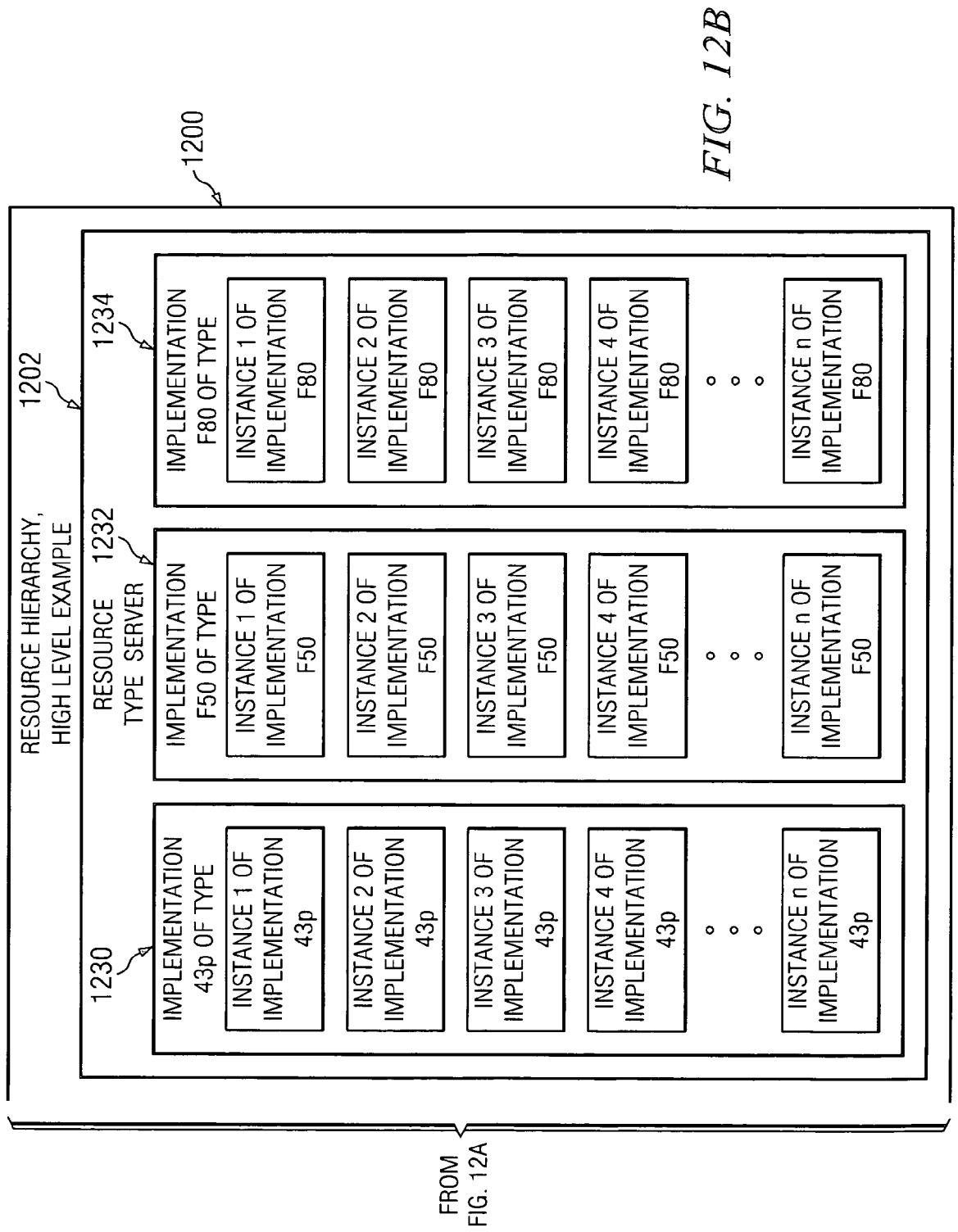

FIGS. 12A and 12B are a block diagram that illustrates a resource hierarchy model 1200 and an example resource hierarchy 1204 in accordance with the present invention.

Resource hierarchy model 1200 includes three levels, a resource type level, an implementation level, and an instance level. Each level is a container for the lower levels. The resource type level, such as level 1204, describes a resource type, such as server, software, VLAN, switch port or IP address.

The resource type level is a container for the implementation and instance levels. The resource type level includes one or more implementations of the resource type. The implementation level, such as level 1206, describes a particular implementation of the resource type. An implementation of a resource type describes the capabilities and status of that implementation for the resource type. For example, many different manufacturers produce different implementations of servers. These implementations are typically described using model numbers. Thus, an implementation of a resource type may be described using a model number of a server produced by a particular manufacturer.

Each implementation level is a container for the instance level. Each implementation level includes one or more particular instances of that implementation. For example, implementation level 1206 includes an instance 1208. The instances are the actual hardware, software products or logical entities defined by provisioning systems. For example, a manufacturer might produce a model ABC of servers. When a customer purchases an instance of this model ABC, the customer might receive a model ABC server that has a serial number 123456.

Referring again to FIGS. 12A and 12B, resource type level 1200 includes three implementations, 1206, 1210, and 1212. Each depicted implementation includes n instances of that implementation. For example, implementation A of type XX includes instances 1-n, depicted as instances 1208, 1214, 1216, 1218, and 1220.

A particular example of a resource hierarchy model is also depicted by FIGS. 12A and 12B. A server resource type 1202 includes three implementations, implementation 43p 1230, implementation F50 1232, and an implementation F80 1234. Each one of these implementations includes particular instances. For example, there are instances 1-n of implementation 43p 1230, instances 1-n, of implementation F50 1232, and instances 1-n of implementation F80 1234.

A resource hierarchy will exist for each different type of resource. Thus, although a resource hierarchy for servers is depicted, a resource hierarchy will also exist for VLANs, switch ports, software, and any other type of resource that may be used.

Figure 13A:
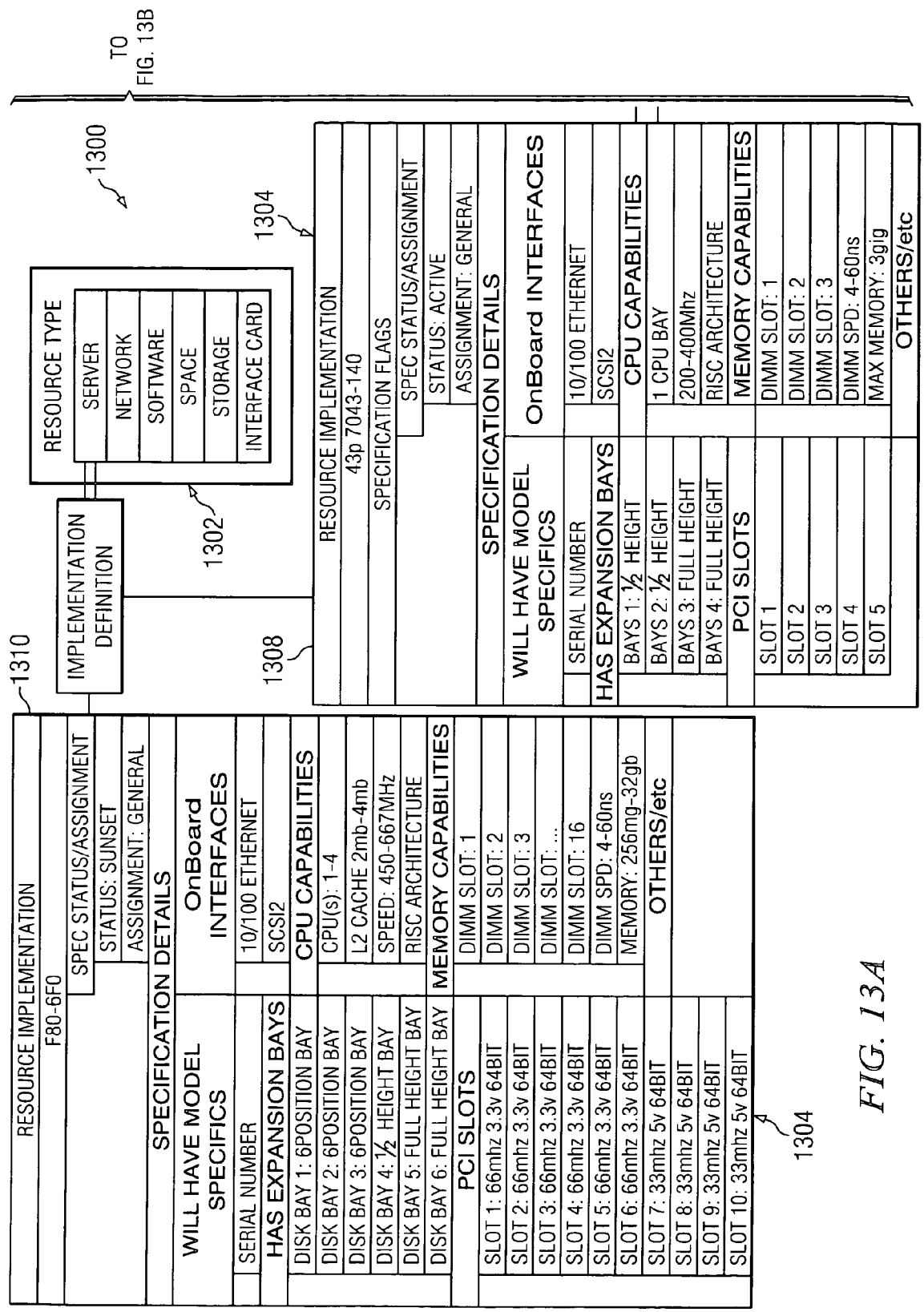

FIGS. 13A and 13B are a block diagram that illustrates a particular resource hierarchy 1300 including definitions of particular implementations and instances in accordance with the present invention. Resource hierarchy 1300 includes a resource type level 1302, implementation level 1304, and an instance level 1306.

There are five types of physical resources depicted in this example in resource type level 1302. These types are server, network, software, storage, and interface cards. There are two different implementations depicted in level 1304, implementation 1308 and 1310. Implementation 1308 describes a server model 43p 1043-140. Implementation 1310 describes a server model F80-6F0.

The capabilities of each implementation are described in detail. For example, implementation 1308 includes five PCI slots, three DIMMs, one CPU that may range between 200 and 400 MHz, four bays, as well as other capabilities. As depicted by FIGS. 13A and 13B, the detailed capabilities of each implementation are included in a particular resource hierarchy. Moreover, the capability of an implementation may include the possible relations or restriction of forming relations with other implementations. For example, the servers of F80-6F0 implementation described here may include a restriction such that they are not capable of running Microsoft operating system software on these bared-metal servers.

In addition to the detailed capabilities of each implementation, the resource hierarchy also includes the details of the capabilities of the particular instances selected for each implementation. For example, instance 1312 describes a particular server model 43p 7043-140. This particular instance 1312 currently has an Ethernet card installed in PCI slot 3 and another installed in PCI slot 4. The CPU for instance 1312 is 200 MHz. Bay 1 currently has a ⅗ floppy drive installed. Bay 2 is empty. Bay 3 has a CD-ROM installed. And, bay 4 has a 9 Gbyte hard drive installed.

In addition to the capabilities of each instance selected for these implementations, the current provisioning state is included. For example, server instance 1312 is currently in the "available" provisioning state, while server instance 1314 is currently in the Reserving state.

As resources go through their life cycle, they are often replaced by newer models that have improved capabilities. Eventually, the older resources will no longer be supported by the provisioning system. At some point, the auto-provisioning tools need to be made aware that a particular resource instance, while still functioning, is being aged out of a given environment. The resource hierarchy may be used to provide this information through specification "status" field. A specification status, such as "Sunset", could be used to indicate a functioning but older resource implementation, such as implementation 1310. Thus, all instances of implementation 1310 are older and support is being phased out by the provisioning system.

The described resource hierarchy above is a generic model to classify resources for a provisioning system. Using this model, this preferred embodiment teaches the following: a canonical set of valid provisioning states can be defined for a resource type; a set of provisioning tasks can be defined for each implementation using the capability information of the implementation. A resource instance will be provisioned from one state to another using the tasks specifically created or set up for the implementation.

Figures 3, 4:
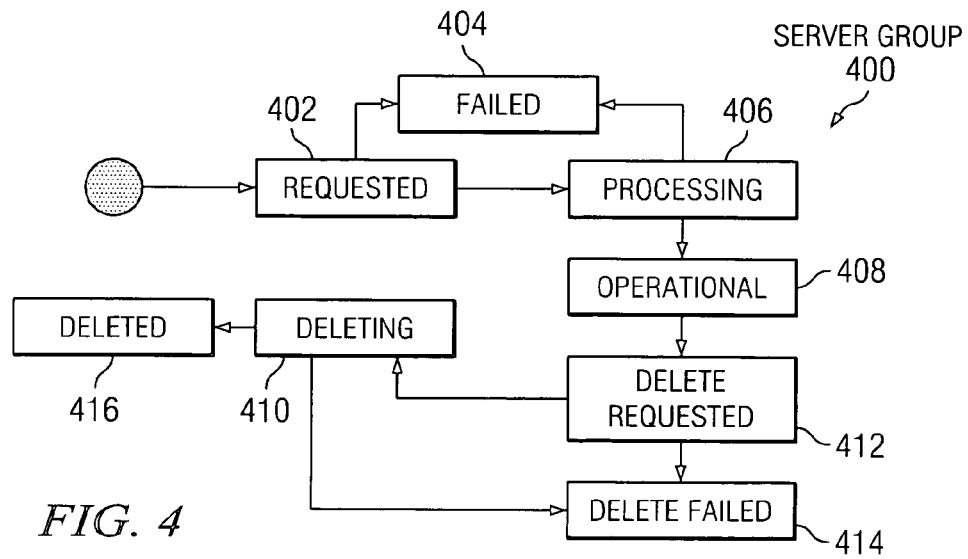
FIG. 3 depicts a table that defines valid provisioning states for multiple different types of resources in accordance with a preferred embodiment of the present invention.
FIG. 4 is an example of a state diagram for a server group type of resource in accordance with the present invention.

FIG. 3 depicts a table 300 that defines valid provisioning states for each one of multiple different types of resources in accordance with a preferred embodiment of the present invention. The valid provisioning states include Requested, Failed, Delete Failed, Processing, Delete Requested, Deleted, Deleting, Operational, Non-operational, Available, Reserving, Reserved, Preassigned and Un-Preassigned. A column is included in the table for each type of resource. For example, a column is included in table 300 for server groups, servers, VLANs, switch ports, and for licensed application software.

Table 300 is provided merely as an example. Those skilled in the art will recognize that columns will also be included when a logically provisioned system includes other types of resources such as those described above. One or more of the possible valid states may be defined for each one of these resource types. In addition, many other provisioning states may be used.

In the example depicted by table 300, a server group will be in one of the following provisioning states: Requested, Failed, Delete Failed, Processing, Delete Requested, Deleting, Deleted, or Operational. A server and a licensed application software will be in one of the following provisioning states: Failed, Processing, Delete Requested, Deleting, Operational, Non-operational, Available, Reserving, or Reserved. A VLAN will be in one of the following provisioning states: Non-operational, Available, Reserving, or Reserved. A switch port will be in either the Operational or Non-operational provisioning state.

Some types of resources may have more than one set of provisioning states. A server will be in a state of the first state set including: Failed, Processing, Delete Requested, Deleting, Delete Failed, Operational, Non-operational, Available, Reserving, or Reserved. A server also has a second set of states which indicates whether the server is preassigned to a specific environment. Its value may be either Preassigned or Un-Preassigned. Possible implementations for multiple set of states include having multiple variables such that each variable will hold one set of valid states. In the example server states, it may have one state variable used for Preassigned and Un-Preassigned states while another variable used for all other valid states. Any mechanism that implements these resource states is included in the method of this invention.

Figure 5:
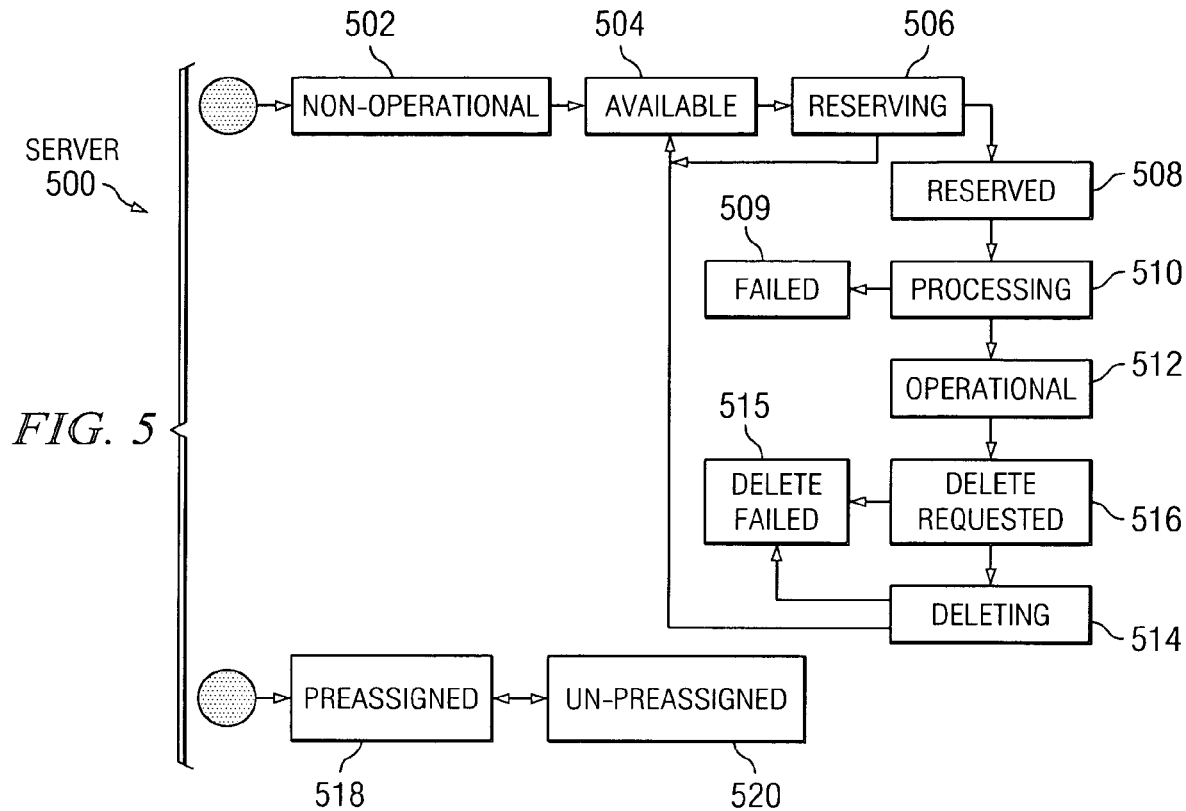
FIG. 5 is an example of a state diagram for a server type of resource in accordance with the present invention.

FIG. 4 is an example of a state diagram 400 for a server group type of resource in accordance with the present invention. A server group is a logical resource type. It represents a collection of one or more servers of certain implementations. A server group that is requested to be provisioned will start as being in the Requested state 402. From the Requested state 402, the server group will move to either the Failed state 404 if the provisioning system can not allocate servers as specified by the request or the Processing state 406 if the request can be satisfied. From the Processing state 406, the server group will move to either the Failed state 404 if the servers selected for the server group are not provisioned successfully or to the Operational state 408 if all servers for the server group are provisioned successfully. An exemplary set of workflows for the transition of server group from the processing state to operational state is shown below in FIG. 11. An exemplary set of transition states for an individual server are shown in FIG. 5. From the Operational state 408, the server group will move to the Delete Requested state 412 if the server group is requested to be removed from operation. From the Delete Requested state 412, the server group will move to either the Deleting state 410 or the Delete Failed state 414. From the Deleting state 410, the server group will move to the Delete failed state 414 if not all of the servers from the server can be successfully deleted or to the Deleted state if all servers can be successfully deleted as depicted by reference 416. No other transitions among these provisioning states are permitted if the states are not defined for the resource type. The tasks and workflows are defined for state transitions based on the resource specifications. This preferred embodiment will use some exemplary workflows to illustrate state transitions.

FIG. 5 is an example of a state diagram 500 for a server type of resource in accordance with the present invention. When a server is first entered to the scope of a provisioning system, it is initially in the Non-operational state 502 until the server is properly connected to the network system and its configuration information is correctly entered into the provisioning system. From the Non-operational state 502, the server will then move to the Available state 504 after the server is appropriately prepared by a set of tasks. An exemplary set of tasks is shown in FIG. 10. From the Available state 504, the server can move to the Reserving state 506. From the Reserving state 506, the server will move to the Reserved state 508 after an applicable set of tasks or workflow processes have been applied. If a resource cannot be moved from Reserving to Reserved, it can be returned to the Available state 504. From the Reserved state 508, the server will move to the Processing state 510. From the Processing state 510, the server will move to the Operational state 512 if the server is successfully provisioned. Otherwise it moves to the Failed state 509. From the Operational state 512, the server can move to the Delete Requested state 516. From the Delete Requested state 516, the server will move to either the Deleting state 514 or the Delete Failed state 515. From the Deleting state 514, the server will move to the Delete Failed state 515 if the server can not be successfully deleted from being provisioned or, if it can be successfully deleted from being provisioned, the server moves to the Available state 504 once more.

The second state variable for the server resource is placed in the Preassigned state 518 when the server is added if the server is to fulfill server allocation for a particular customer such that it will not be allocated to another customer. Later, a server that has been preassigned may move to the Un-Preassigned state 520 if the server is requested to be no longer preassigned.

Some of resource types may have the same set of transition states. For example, the state diagram in FIG. 5 is applicable to licensed application software as indicated in the table of FIG. 3. Though the state transitions are the same, the workflows for the state transitions of licensed application software may be remarkably different.

Figure 6:
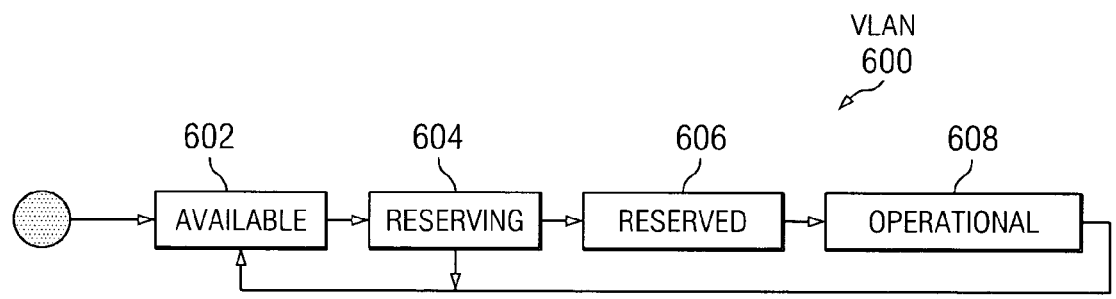
FIG. 6 is an example of a state diagram for a virtual local area network (VLAN) type of resource in accordance with the present invention.

FIG. 6 is an example of a state diagram 600 for a virtual local area network (VLAN) type of resource in accordance with the present invention. A VLAN is first defined to be in the Available state 602. From the Available state, the VLAN will move to the Reserving state 604. From the Reserving state 604, the VLAN will move to the Reserved state 606 or return to Available state. From the Reserved state 606, the VLAN will move to the Operational state 608. From the Operational state 608, the VLAN can return to the Available state 602. No other transitions among provisioning states are permitted.

Figure 7:
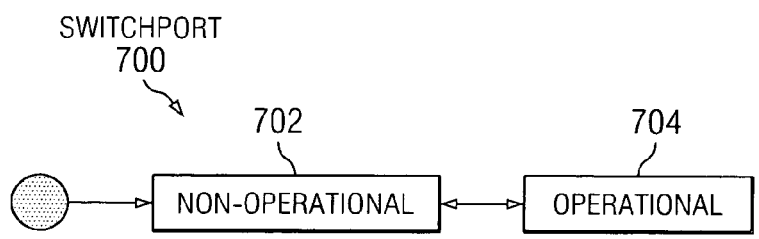
FIG. 7 is an example of a state diagram for a switch port type of resource in accordance with the present invention.

FIG. 7 is an example of a state diagram 700 for a switch port type of resource in accordance with the present invention. A switch port is initially defined to be in the Non-operational state 702. From the Non-operational state 702, the switch port will move to the Operational state 704. From the Operational state 704, the switch port can move to the Non-operational state 702.

Figure 8:
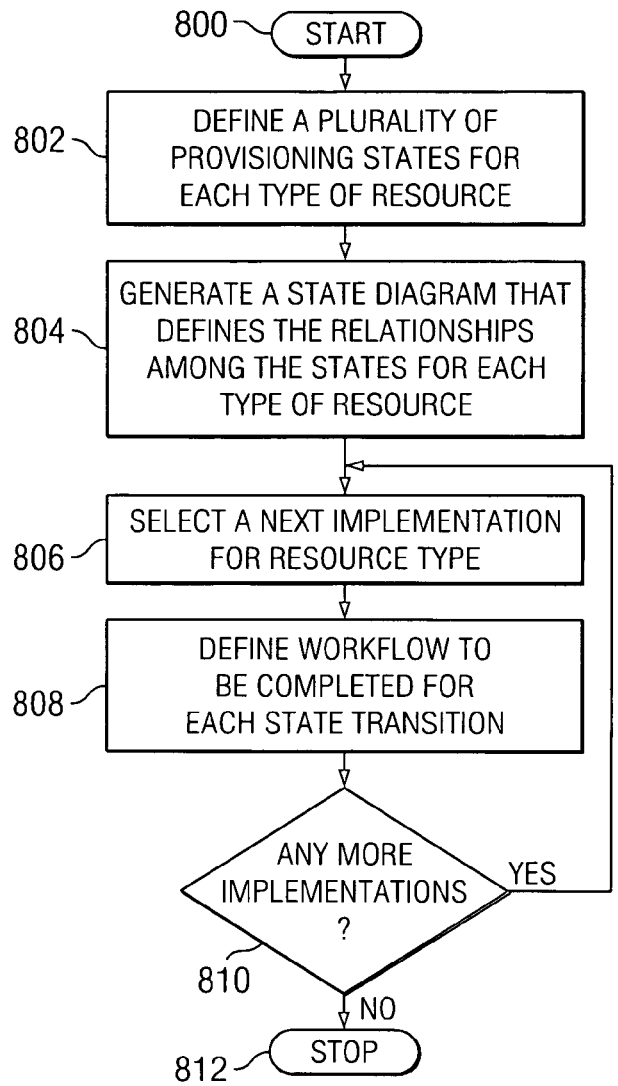
FIG. 8 depicts a high level flow chart which illustrates generating a state diagram that defines provisioning states and workflows for each of multiple different types of resources in accordance with the present invention.

FIG. 8 depicts a high level flow chart which illustrates generating a state diagram that defines provisioning states for each of multiple different types of resources in accordance with the present invention. The process starts as depicted by block 800 and thereafter passes to block 802 which illustrates defining a plurality of provisioning states for each type of resource. Next, block 804 depicts generating a state diagram for each resource type that defines the relationships and valid transitions among the states. Next, block 806 depicts a selection of each implementation that is defined for a resource type. Thereafter, block 808 depicts defining a workflow of one or more tasks to be completed for each valid state transition. Next, block 810 illustrates a determination of whether or not there are any more implementations. If a determination is made that there are more no more implementations, the process terminates as depicted by block 812. Otherwise, the process returns to block 806.

Figure 9:
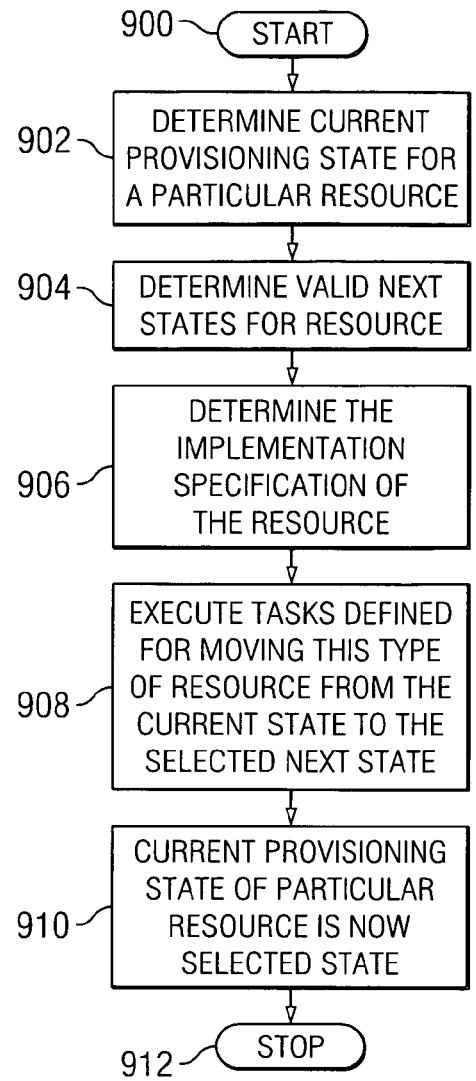
FIG. 9 illustrates a high level flow chart which depicts a resource transitioning from one state to next state by executing workflows associated with the state transitions in accordance with the present invention.

FIG. 9 illustrates a high level flow chart which depicts a resource transitioning from one state to next state by executing workflows associated with the state transitions in accordance with the present invention. The process starts as depicted by block 900 and thereafter passes to block 902 which illustrates the determination of a current provisioning state for a particular resource. This resource is of a particular type. Thus, a particular instance of a resource is in a particular provisioning state. For example, there may be a particular server having serial number 123456 that is currently in the Operational state.

Next, block 904 illustrates using the state diagram for this type of resource to determine what states are valid next possible states. For example, if the resource is a server and it is in the Operational state, the Delete Requested state is the only valid next state while the Available state is not a valid next state. Thereafter, block 906 depicts determining the implementation of the resource in order to select the appropriate workflow tasks for state transition.

Thereafter, block 908 depicts executing the workflow that has been defined for moving a resource of this type and implementation from the current state to the selected next state or next possible states. An example is given in FIG. 10. Block 910, then, illustrates the current provisioning state of the particular resource being the selected state. The process then terminates as illustrated by block 912.

FIG. 10 depicts a high level flow chart which describes an example of the workflow for moving a server from a "Non-operational" state to an "Available" state in accordance with the present invention. Initially, the server is in the Non-operational state. Next, the appropriate server implementation is obtained, as depicted by block 1000, from a repository 1002. Setup instructions as part of the provisioning tasks are then obtained, as illustrated by block 1004, also from a repository 1002. The server is then racked and cabled using the instructions obtained from previous task, see block 1008. The server's provisioning state is then set to Available as depicted by block 1010. This status, including the current provisioning state, is stored in the repository 1002. Note that the repository 1002 while depicted as a single entity could be multiple repositories, and repositories can be any form of persistent store.

Figure 11:
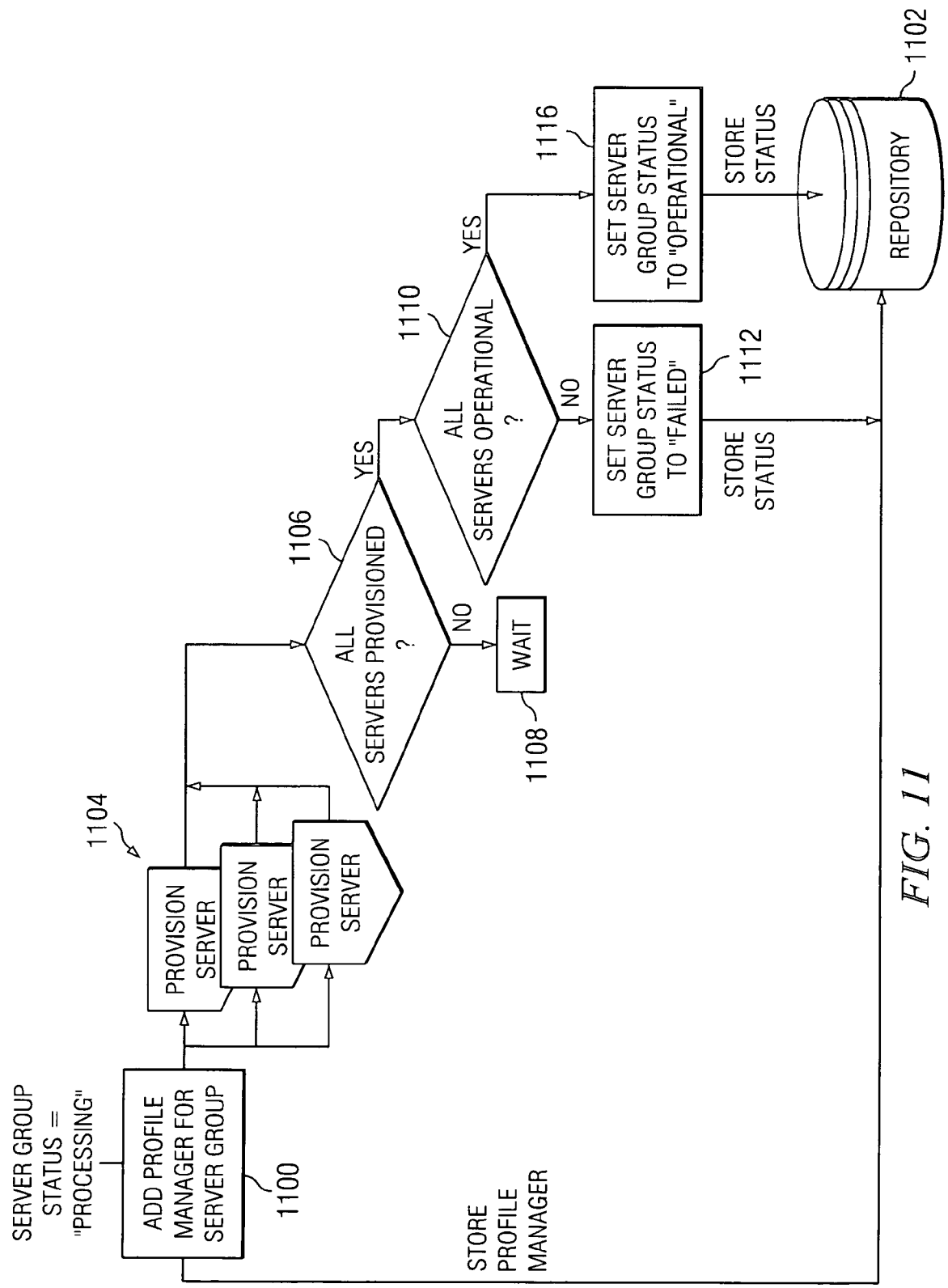
FIG. 11 is a block diagram that illustrates an example of workflow moving a server group from a "Processing" state to either an "Operational" state or a "Failed" state in accordance with the present invention.

FIG. 11 depicts a high level flow chart which describes an example workflow to move a server group from a "Processing" state to either an "Operational" state or a "Failed" state in accordance with the present invention. Initially, the server group is in the Processing provisioning state. Next, a Profile Manager is added to the repository 1102 for this server group as part of the workflow tasks. The servers of the server group are provisioned as depicted by blocks 1104.

Next, as illustrated by block 1106, a determination is made regarding whether all of the servers of the server group have been provisioned. If a determination is made that not all of the servers of the group have been provisioned, the process passes to block 1108 which depicts waiting until all of the servers have been provisioned. Referring again to block 1106, if a determination is made that all of the servers in the server group have been provisioned, the process passes to block 1110 which illustrates determining whether all of the servers of the group are operational. If a determination is made that not all of the servers of the group are operational, the process passes to block 1112 which depicts setting the provisioning state for the server group to Failed, and storing the status including this current provisioning state in the repository 1102.

Referring again to block 1110, if a determination is made that all of the servers of the group are operational, the process passes to block 1116 which illustrates setting the provisioning state to Operational, and storing the status including this current provisioning state in the repository 1102. This example also illustrates conditional transitions. A server group consists of a number of particular server instances. Thus, the state transition of a server group will only be completed if all of the servers of the group have completed their state transitions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing the provisioning of a plurality of different types of resources in a data processing system, said method comprising:

defining a plurality of provisioning states for each one of said plurality of different types of resources, wherein each one of said plurality of different types of resources is associated with at least one of a capability specification and an implementation specification, and wherein said plurality of different types of resources are grouped according to the specification;

defining relationships among said plurality of provisioning states, said relationships describing valid transitions from ones of said plurality of provisioning states to other ones of said plurality of provisioning states;

generating a state diagram for each one of said plurality of different types of resources, each one of said plurality of different types of resources being associated with one of said state diagrams, wherein each one of said state diagrams describing valid transitions for said plurality of provisioning states defined for each one of said plurality of different types of resources; and defining at least one task that is associated with each one of said valid transitions, wherein defining at least one task that is associated with each one of said valid transitions comprises:

specifying a plurality of tasks for each one of said valid transitions;

specifying a sequence for completion for said plurality of tasks for each one of said valid transitions, said plurality of tasks being required to be completed in said sequence in order to complete each one of said valid transitions; and providing said plurality of tasks in said sequence as a module that will complete one of said valid transitions when said module is executed; and utilizing said module to complete said one of said valid transitions for each one of said plurality of different types of resources, wherein the same module is used regardless of which resource type is being transitioned.

2. A data processing system for managing the provisioning of a plurality of different types of resources in a data processing system, comprising:

a set of instructions; and a processor, wherein the processor executes the set of instructions to define a plurality of provisioning states for each one of said plurality of different types of resources, wherein each one of said plurality of different types of resources is associated with at least one of a capability specification and an implementation specification, and wherein said plurality of different types of resources are grouped according to the specification;

wherein the processor executes the set of instructions to define relationships among said plurality of provisioning states, said relationships describing valid transitions from ones of said plurality of provisioning states to other ones of said plurality of provisioning states;

wherein the processor executes the set of instructions to generate a state diagram for each one of said plurality of different types of resources, each one of said plurality of different types of resources being associated with one of said state diagrams, wherein each one of said state diagrams describing valid transitions for said plurality of provisioning states defined for each one of said plurality of different types of resources;

wherein the processor executes the set of instructions to define at least one task that is associated with each one of said valid transitions, wherein the processor executing the set of instructions to define at least one task that is associated with each one of said valid transitions further comprises the processor executing the set of instructions to specify a plurality of tasks for each one of said valid transitions, to specify a sequence for completion for said plurality of tasks for each one of said valid transitions, said plurality of tasks being required to be completed in said sequence in order to complete each one of said valid transitions, and to provide said plurality of tasks in said sequence as a module that will complete one of said valid transitions when said module is executed; and wherein the processor executes the set of instructions to utilize said module to complete said one of said valid transitions for each one of said plurality of different types of resources, wherein the same module is used regardless of which resource type is being transitioned.

3. A computer program product stored on a computer usable storage medium for managing the provisioning of a plurality of different types of resources in a data processing system, said product comprising:

instructions for defining a plurality of provisioning states for each one of said plurality of different types of resources, wherein each one of said plurality of different types of resources is associated with at least one of a capability specification and an implementation specification, and wherein said plurality of different types of resources are grouped according to the specification;

instructions for defining relationships among said plurality of provisioning states, said relationships describing valid transitions from ones of said plurality of provisioning states to other ones of said plurality of provisioning states;

instructions for generating a state diagram for each one of said plurality of different types of resources, each one of said plurality of different types of resources being associated with one of said state diagrams, wherein each one of said state diagrams describing valid transitions for said plurality of provisioning states defined for each one of said plurality of different types of resources; and instructions for defining at least one task that is associated with each one of said valid transitions, wherein said instruction means for defining at least one task that is associated with each one of said valid transitions, comprises:

instructions for specifying a plurality of tasks for each one of said valid transitions;

instructions for specifying a sequence for completion for said plurality of tasks for each one of said valid transitions, said plurality of tasks being required to be completed in said sequence in order to complete each one of said valid transitions; and instructions for providing said plurality of tasks in said sequence as a module that will complete one of said valid transitions when said module is executed; and instructions for utilizing said module to complete said one of said valid transitions for each one of said plurality of different types of resources, wherein the same module is used regardless of which resource type is being transitioned.

* * * * *

UNITED STATES PATENT AND TRADEMARK OFFICE
CERTIFICATE OF CORRECTION

PATENT NO. : 7,610,584 B2
APPLICATION NO. : 10/751317
DATED : October 27, 2009
INVENTOR(S) : Brooks et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1540 days.

Signed and Sealed this

Twelfth Day of October, 2010

David J. Kappos
*Director of the United States Patent and Trademark Office*